United States Patent [19]

Wechs

[11] Patent Number: 4,976,859

[45] Date of Patent: Dec. 11, 1990

[54] INTEGRAL ASYMMETRIC POLYETHER-SULFONE MEMBRANE, PROCESS FOR ITS PRODUCTION, AND USE FOR ULTRAFILTRATION AND MICROFILTRATION

[75] Inventor: Friedbert Wechs, Wörth, Fed. Rep. of Germany

[73] Assignee: Akzo N.V., Netherlands

[21] Appl. No.: 401,859

[22] Filed: Sep. 1, 1989

[30] Foreign Application Priority Data

Sep. 1, 1988 [DE] Fed. Rep. of Germany ....... 3829752

[51] Int. Cl.$^5$ .............................................. B01D 71/68
[52] U.S. Cl. ................................. 210/500.23; 264/41; 210/500.41
[58] Field of Search .............. 210/651, 500.41, 500.23; 264/41, 45.1, 45.5, DIG. 48, DIG. 62

[56] References Cited

U.S. PATENT DOCUMENTS

| | | | |
|---|---|---|---|
| 4,347,138 | 8/1982 | Ohno et al. | ........................ 210/651 |
| 4,612,119 | 9/1986 | Eguchi . | |

FOREIGN PATENT DOCUMENTS

| | | |
|---|---|---|
| 0036947 | 10/1981 | European Pat. Off. . |
| 0037185 | 10/1981 | European Pat. Off. . |
| 0121911 | 10/1984 | European Pat. Off. . |
| 0228072 | 7/1987 | European Pat. Off. . |
| 0294737 | 12/1988 | European Pat. Off. . |
| 3327638 | 2/1985 | Fed. Rep. of Germany . |
| 3342824 | 6/1985 | Fed. Rep. of Germany . |
| 3701633 | 8/1988 | Fed. Rep. of Germany . |

OTHER PUBLICATIONS

Robert E. Kesting, Ph.D., "Synthetic Polymeric Membranes", 1971, p. 3, FIG. 1.2.
Patents Abstracts of Japan, C-278, Apr. 25, 1985, vol. 9/No. 96.
Patents Abstracts of Japan, C-343, May 6, 1986, vol. 10/No. 120.
JP 62 019 201-A, CPI-Profile Booklet, 1987, Ref. 87-067511/10.

*Primary Examiner*—Frank Sever
*Attorney, Agent, or Firm*—Oliff & Berridge

[57] ABSTRACT

An integral polyether-sulfone membrane with a pore system open at the outer boundaries is in the form of flat films, tubular films or hollow fibers having a maximum pore diameter of 0.02 $\mu$m to 2 $\mu$m. The pore system is cellular throughout with cells having polyhedrally symmetrical boundaries. The cells are arranged asymmetrically from one surface of the membrane to the other, the asymmetry factor AF relative to the maximum pore diameter being 0.01 to 2.0. The ratio of the maximum mean free path length of the flow path to the diameter of the largest pore is greater than 3. The cell size changes steadily from one surface to the other surface. The membrane is produced by dissolving 12 to 35% by weight, relative to the total solution, of polyethersulfone in a mixture of 15 to 65% by weight of $\epsilon$-caprolactam, 0 to 85% by weight of latent solvent, 0 to 15% by weight of thickener and 0 to 50% by weight of non-solvent, and if appropriate up to 1% by weight of auxiliaries, forming the solution into flat films, tubular films or hollow fibers (the latter preferably with the aid of an internal fluid), and transformation into the solid phase and removal of the mixture forming the solvent. The membrane may be used for ultrafiltration and microfiltration.

20 Claims, 7 Drawing Sheets

FRACTURE SURFACES

350:1

INNER WALL     5000:1

OUTER WALL     5000:1

INSIDE          5000:1

OUTSIDE         5000:1

FRACTURE SURFACES
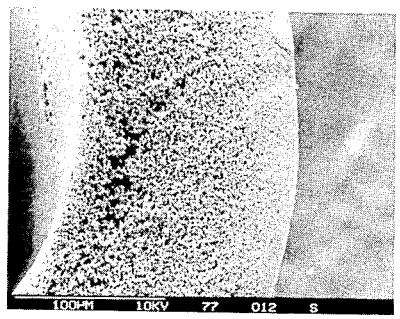
FIG. 7A  390:1
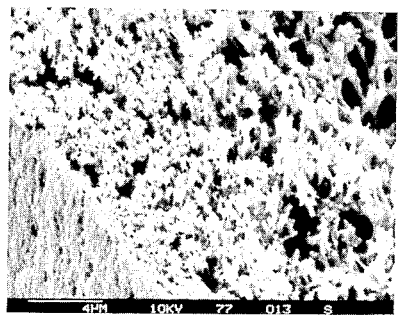
FIG. 7B  5000:1
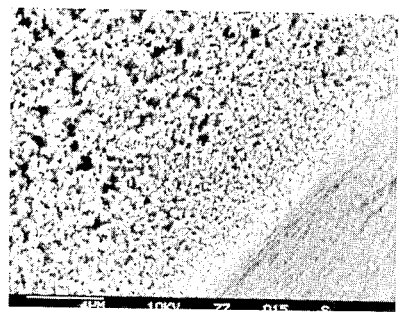
FIG. 7C  5000:1

INTEGRAL ASYMMETRIC POLYETHER-SULFONE MEMBRANE, PROCESS FOR ITS PRODUCTION, AND USE FOR ULTRAFILTRATION AND MICROFILTRATION

TECHNICAL FIELD

The invention relates to an integral polyethersulfone membrane with a pore system open at the outer boundaries, in the form of flat films, tubular films or hollow fibers having a maximum pore diameter of 0.02 μm to 2 μm, measured by the blow point method, as well as to a process for producing the membrane and to its use for ultrafiltration and microfiltration.

BACKGROUND

From EP No. 121,911-A1, a filter membrane is known which consists of a polysulfone in the form of a hollow fiber, having a network structure across the entire thickness from the inner to the outer surface and in which the pores have a maximum pore diameter from 0.1 to 5 μm and the pore orifices at the inner surface have a maximum diameter from 0.01 to 10 μm and the orifices of the pores formed in the outer surface have a maximum diameter from 0.01 to 5 μm.

Even though the pore structure is described as a homogeneous network structure or sponge structure, a broad distribution of the diameters of the orifices in the region of the outer wall surface is shown in an enlarged sectional illustration of the hollow fiber. The known membrane does not contain any skin in which only narrower pores than in the sponge structure exist, but contains widely different orifices, broken open outwards, of the network or sponge structure.

From EP No. 228,072-A2, a filter membrane is known wherein the polymer forming the membrane is as such hydrophobic and has a water absorption capacity of about 2 to 4%, and the membrane is hydrophillic, has a pore size from 0.02 μm to 20 μm and, at a given blow point, shows a high water flow velocity. Preferably, the polymer is polyether-sulfone and contains additions of polyethylene glycol or polyvinylpyrrolidone.

In the process for producing shaped articles having pores according to German Pat. No. 3,327,638, a porous polyamide-6 hollow fiber has been produced from a mixture of polyamide-6, ε-caprolactam and polyethylene glycol 300. Forming took place at a nozzle temperature of 210° C. The spinning solution was homogeneous and of low viscosity and was therefore extruded into a U-shaped cooling tube, in which the mechanical loading, to which the polymer mixture is exposed up to the time of starting solidification, that is to say the start of dimensional stability, is kept small.

The membranes known from EP No. 121,911-A1 and EP No. 228,072A1 are formed from solutions of the polymer in aprotic solvents by known membrane formation processes. Examples of aprotic solvents are dimethylacetamide, dimethylformamide and N-methylpyrrolidone. The polymer contents of the solutions are decidedly low. For this reason, the viscosities are also low and thin-walled and mechanically less stable membranes are produced preferentially. The known membranes are virtually symmetrical, which has the consequence that the membrane flow decreases markedly with the thickness of the membrane.

SUMMARY OF THE INVENTION

An object of the present invention is to provide a temperature-resistant filtration membrane, which is chemically stable, in particular to oxidizing agents, with a pore system open at the outer boundaries, the special flow characteristics of which mean that, at the same structural build-up, it allows a flow of water which is largely independent of the membrane thickness.

This and other objects are achieved by an integral polyethersulfone membrane, wherein the pore system is cellular throughout. The cells have polyhedrally symmetrical boundaries and are arranged asymmetrically within the wall from one boundary of the wall to the other. The asymmetry factor AF relative to the maximum pore diameter is 0.01 to 2.0. The ratio of the maximum mean free path length of the flow path to the diameter of the largest pores is greater than 3. The cell size changes steadily from one surface to the other surface.

BRIEF DESCRIPTION OF THE DRAWINGS

FIGS. 6 and 7 are scanning electron micrographs of membranes according to the invention.

DETAILED DESCRIPTION OF PREFERRED EMBODIMENTS

The maximum pore diameter is determined by means of the blow point method (ASTM no. 128-61 and F 316-70), for which the method described in DE No. 3,617,724-A1 is suitable, for example. In this case, $d_{max}$ results from the gas space pressure $P_B$ belonging to the blow point in accordance with the equation $$d_{max} = \sigma_B / P_B$$

where $\sigma_B$ is a constant which is mainly characteristic of the wetting liquid. The values of $\sigma_B$ at 25° C. are, for example, 0.611 μm×bar for isopropanol and 2.07 μm×bar for $H_2O$.

In contrast to the symmetrical membrane from the state of the art, for example produced according to German Offenlegungsschrift No. 2,833,493, there is a substantially smaller dependence of the flow on the membrane thickness in membranes according to the invention.

Figure 1:
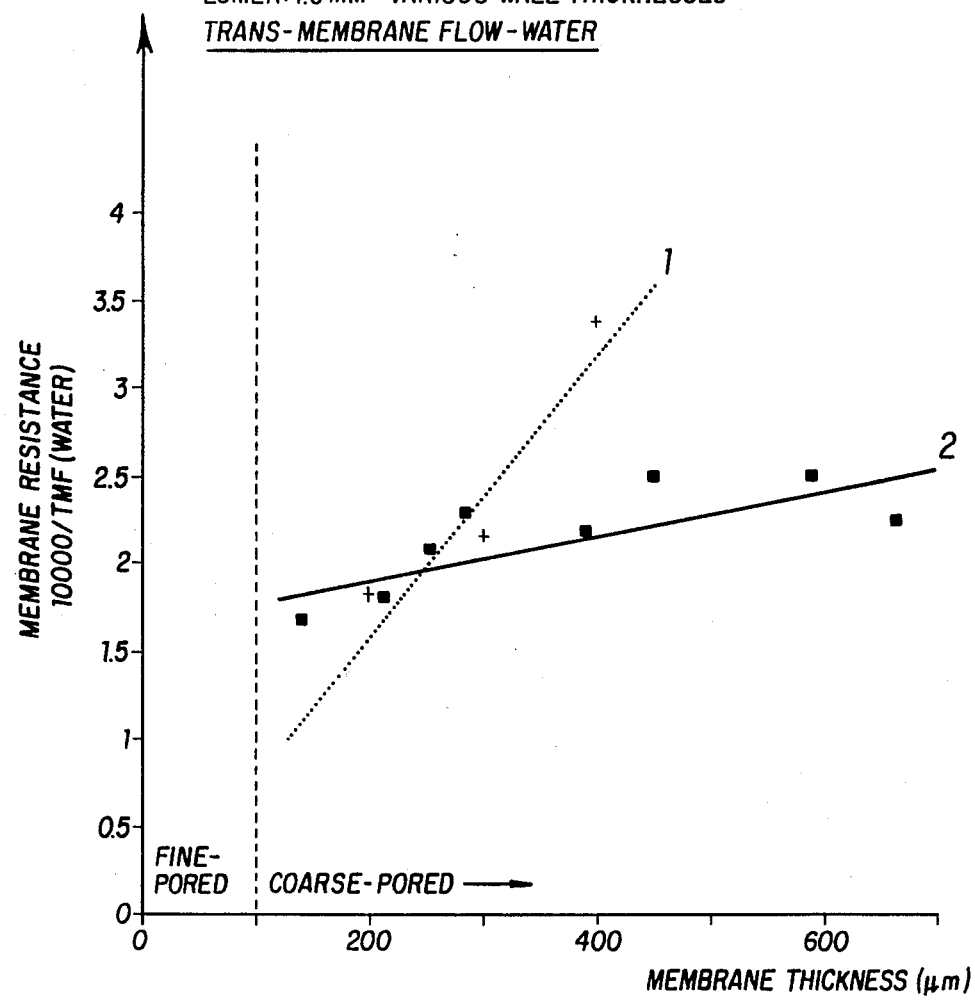
FIG. 1 is a graph of membrane thickness against membrane resistance of a prior art membrane and a membrane of the invention.

FIG. 1 shows a diagram in which the straight line 1 corresponds to the membrane known from German Offenlegungsschrift No. 2,833,493. The straight line 2 corresponds to the membrane according to the invention (produced according to Example 1).

The asymmetry in the membrane cross-section is defined by the asymmetry factor AF relative to the maximum pore diameter, where $$AF = \frac{LS_{max}}{S_{max} \cdot d_{max}} \ [\mu m^{-1}]$$

LS is the mean free path length of the flow path in the membrane between the cell walls, and is determined from a transmission electron micrograph of the membrane cross-section at 4100-fold magnification using an image evaluation system, for example Quantiment 970, in each case at the defined distance S from the membrane wall.

$LS_{max}$ is the corresponding maximum free path length in a membrane and the associated distance from the membrane wall is termed $S_{max}$. The resulting quotient is related to the maximum pore diameter $d_{max}$, which is established by blow point determination and which governs the trans-membrane flow.

The transmission electron micrograph is taken on thin sections transversely to the wall at a section thickness of 80 nm. To make the sections, the membrane is embedded in methacrylate, and the latter is washed out with carbon tetrachloride after cutting.

The mean free path lengths determined at various distances from the membrane wall are plotted graphically as a function of the associated distance from the outer wall. The measured values can be represented as a steady curve with a maximum. The asymmetry factor AF then results from the maximum mean free path length and the distance of the maximum from the wall and the maximum pore diameter.

Figure 3:
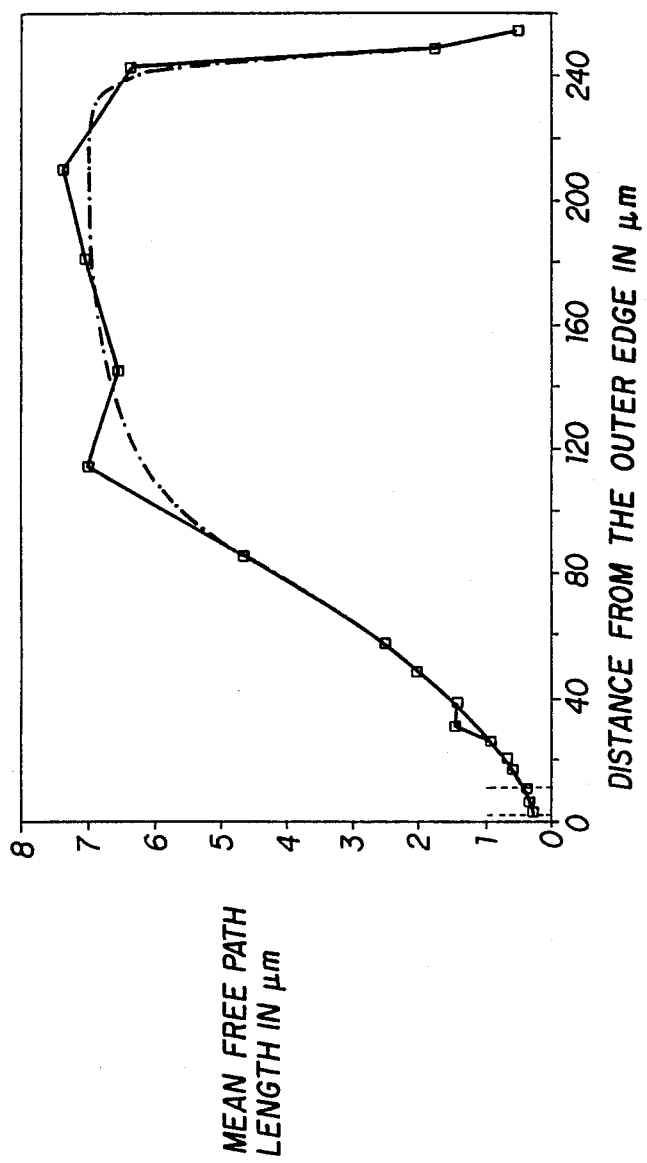
FIG. 3 is a graph of mean free path length against distance from the outer edge of the membrane of Example 1C.

The values belonging to Example 1C are listed in the table below and graphically shown in FIG. 3.

TABLE 1

| Distance from the outer edge in $\mu m$ | Mean free path length in $\mu m$ | Standard deviation ($\pm$) |
|---|---|---|
| 3.09 | 0.32 | 0.26 |
| 6.19 | 0.34 | 0.26 |
| 10.47 | 0.39 | 0.30 |
| 16.66 | 0.60 | 0.46 |
| 20.94 | 0.67 | 0.52 |
| 26.18 | 0.93 | 0.74 |
| 30.94 | 1.46 | 1.32 |
| 38.79 | 1.43 | 1.10 |
| 48.31 | 2.04 | 1.62 |
| 57.12 | 2.52 | 1.74 |
| 85.68 | 4.64 | 3.43 |
| 114.24 | 6.99 | 4.19 |
| 145.18 | 6.53 | 5.14 |
| 180.88 | 7.03 | 3.85 |
| 209.44 | 7.35 | 3.92 |
| 242.28 | 6.34 | 4.81 |
| 248.71 | 1.74 | 1.88 |
| 154.18 | 0.50 | 0.44 |

By selection of different process parameters, membranes according to the invention can be produced, the asymmetry factor of which is between 0.01 and 2.0.

It is presupposed here that the ratio of the maximum mean free path length to the diameter of the largest pore is greater than 3, preferably between 5 and 100, that is to say that a marked asymmetry of the pore system is noticeable. At the same time, it is necessary that the pore size does not change suddenly, but steadily.

Figure 4:
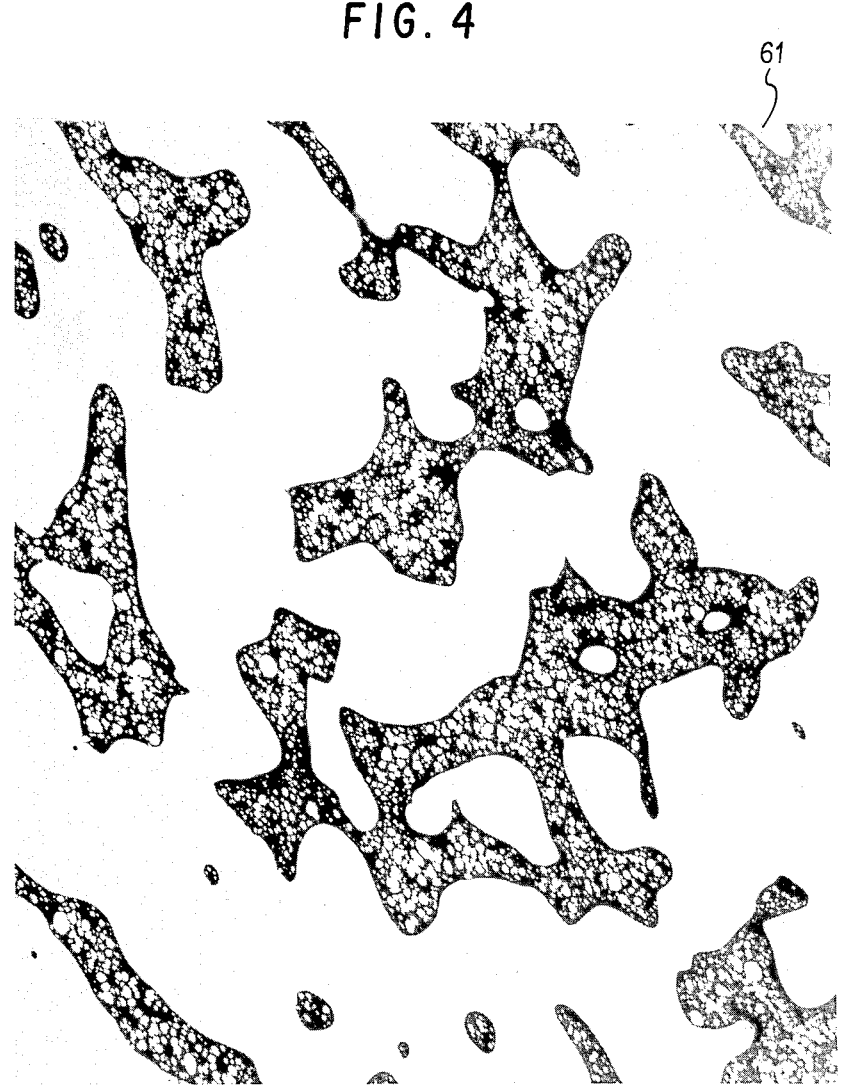
FIGS. 4 and 5 are transmission electron micrographs of membranes according to the invention.
Figure 5:
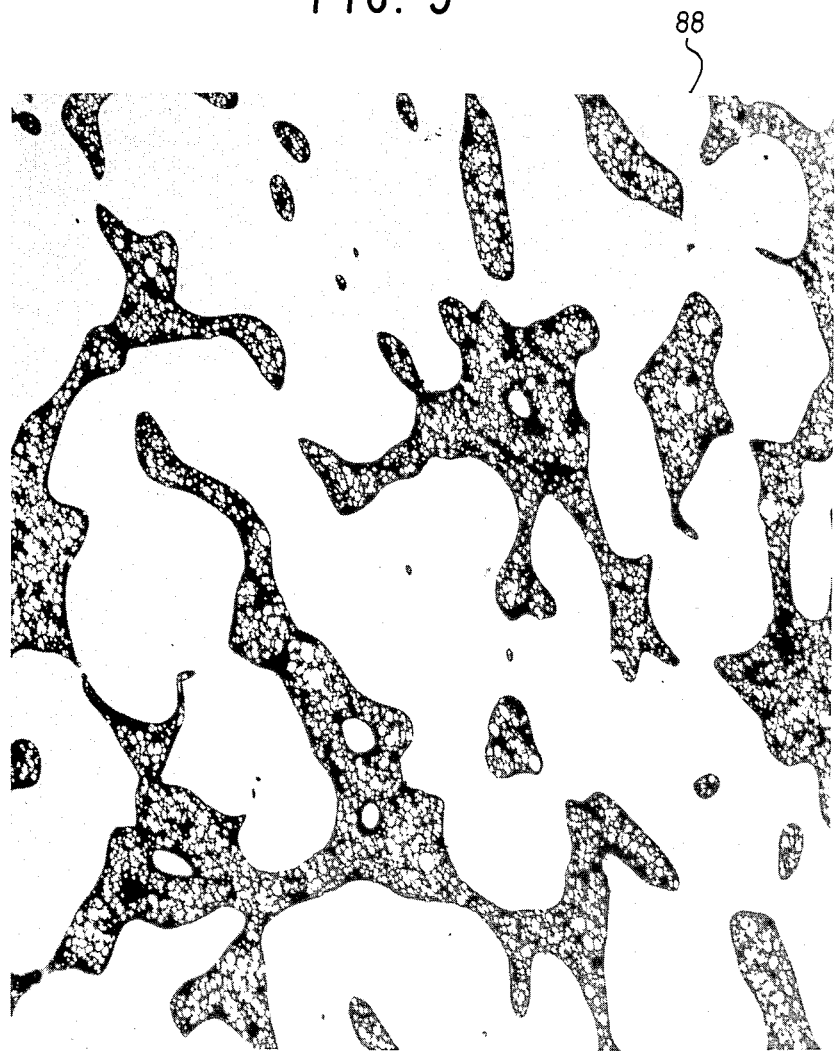
Figure 6A:
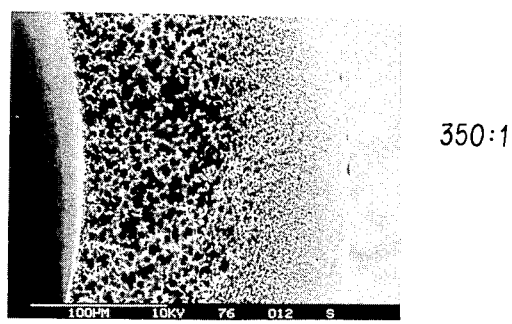
Figure 6B:
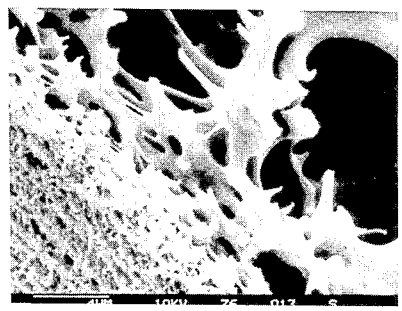
Figure 6C:
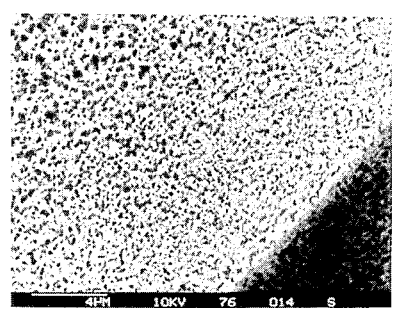
Figure 6D:
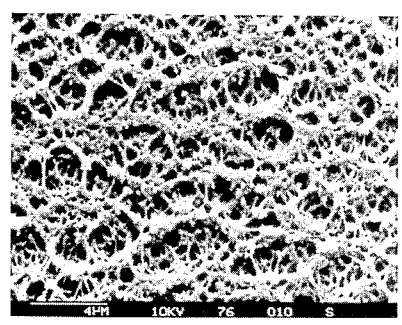
Figure 6E:
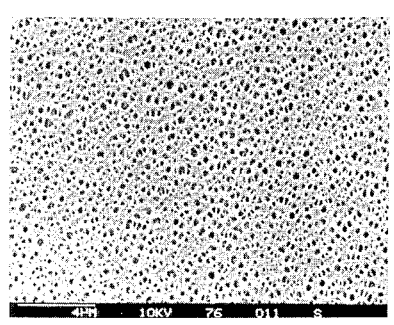

FIG. 4 and FIG. 5 show, by way of example, typical transmission electron micrographs of a membrane according to the invention, such as are used for image evaluation in the determination of the mean free path length.

Preferably, the membranes according to the invention are obtained in such a way that they are formed from a mixture containing at least 15% by weight of ε-caprolactam.

ε-Caprolactam is a hygroscopic substance melting at about 70° C. and having a boiling point (under normal pressure) of 268.5° C. It is readily soluble in water and numerous organic solvents such as, for example, toluene, isopropanol, glycerol, polyethylene glycol, butyrolactone, propylene carbonate, ethyl acetate, methyl ethyl ketone or cyclohexane. It is produced industrially on a considerable scale and forms the monomer for polyamide 6 polymers, and is therefore available at low prices. With exclusion of oxygen, ε-caprolactam is thermally stable, disregarding the fact that, at temperatures of 260°–270° C. in the presence of water, it undergoes a poly-addition to form polyamide-6, with ring opening.

From its use as the monomer for polyamide-6, the properties of ε-caprolactam are well known. The recovery of ε-caprolactam from aqueous solution is likewise well known.

ε-Caprolactam is a substance of very low toxicity. It is the view that, in handling ε-caprolactam, apart from the nuisance due to the bitter taste and the possible irritation of mucosae by ε-caprolactam powder, there is no health risk even in the case of repeated exposure. Because of the high solubility, any residues can be completely removed from the membranes formed by means of ε-caprolactam.

ε-Caprolactam differs from the aprotic solvents usually employed for polyether-sulfone membranes by the proton present on the nitrogen atom and by the fact that it confers a relatively high viscosity on the solutions.

The polyether-sulfone membranes according to the invention can be designed to be hydrophobic or, in a special embodiment of the invention, to be hydrophillic. In this special embodiment, additives conferring a hydrophillic character can be added to the mixture during membrane formation.

In another embodiment of the invention, leading to hydrophillic membranes, the polyether-sulfone used is at least partially sulfonated.

The invention also relates to a process for producing the membrane according to the invention.

The production of the membrane according to the invention is carried out by dissolving 12 to 35% by weight, relative to the total solution, of polyether-sulfone in a mixture of 15 to 65% by weight of ε-caprolactam, 0 to 85% by weight of latent solvent, 0 to 15% by weight of thickener and 0 to 50% by weight of non-solvent, and if appropriate up to 1% by weight of auxiliaries, each relative to the mixture, and forming the solution into flat films, tubular films or hollow fibers (the latter preferably with the aid of an internal fluid), and transformation into the solid phase and removal of the mixture forming the solvent.

Polyether-sulfones which are used according to the invention are represented by the formula:

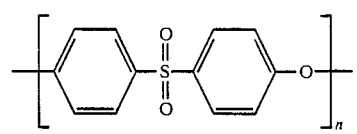

If appropriate, they can also be substituted. In particular, they can also be partially sulfonated. The polymer can also be a copolymer, in which case a co-condensation with polyethers is particularly suitable.

Within the scope of the present invention, latent solvents are understood to be those substances which dissolve the membrane-forming polymer only sparingly or at elevated temperature. Examples of such latent solvents are butyrolactone and propylene carbonate.

Thickeners are understood to be those substances which increase the viscosity of the solution. Examples of thickeners in the solutions under consideration here are polyvinylpyrrolidone, polyethylene glycol, polyacrylic acid and polyacrylates.

Examples of non-solvents within the scope of the present invention are water, glycerol, triacetin, ethyl lactate and polyethylene glycol.

Auxiliaries within the scope of the present invention include conventional stabilizers, nucleating agents, pigments and the like.

The dissolution of the polymer is preferably carried out at temperatures of 60°–140° C.

Preferably, 15 to 25% by weight of polyether-sulfone, relative to the total solution, is dissolved in a mixture containing 40 to 60% by weight of ε-caprolactam.

To form the lumen of hollow fibers, internal fluids are usually applied. Depending on the choice of internal fluid, the latter can, in the present invention, also have an effect on the structure of the zone adjoining the inner wall. In this case, the processing temperature, the characteristics of the solvent/non-solvent property and the miscibility with the solvent mixture play an important part.

It is possible in the present invention to transform the formed solution into the solid phase in a conditioning chamber charged with non-solvent vapors.

In an embodiment of the invention, it is also possible, with adequate residence time, to effect the transformation into the solid phase by spontaneous crystallization of the solvent mixture after supercooling.

The transformation into the solid phase is in general effected by coagulation of the formed solution in a non-solvent bath. In a further embodiment of the invention, the transformation into the solid phase is effected by coagulation in a non-solvent bath, the temperature of the solution and the temperature of the non-solvent bath being 40°–60° C.

To increase the chemical stability, it is advantageous to heat-treat the membrane for one or more hours at temperatures of 170°–210° C.

The invention also relates to the use of the polyether-sulfones according to the invention for ultrafiltration and microfiltration. Ultrafiltration and microfiltration concern pressure-driven membrane filtrations for separating off defined particle sizes. The particle size ranges given in the literature for ultrafiltration and microfiltration largely overlap. On page 3 of the book "Synthetic Polymeric Membranes" by Robert E. Kesting, 1971, FIG. 1.2, the membrane separation processes with the respective particle sizes are illustrated. This illustration shows that the range for ultrafiltration can comprise particle sizes of about 0.003 μm to 10 μm and that for microfiltration about 0.03 μm up to about 20 μm.

The membrane according to the invention can be used in the foodstuffs sector without restriction, because it does not contain any toxically relevant substances.

As a result of the pronounced asymmetry of the cellular pore system, high permeabilities are achieved, and the flow through the membrane is largely independent of the total thickness of the membrane.

FIG. 1 shows that, in spite of widely differing wall thicknesses, the transmembrane flows differ only slightly.

Figure 2:
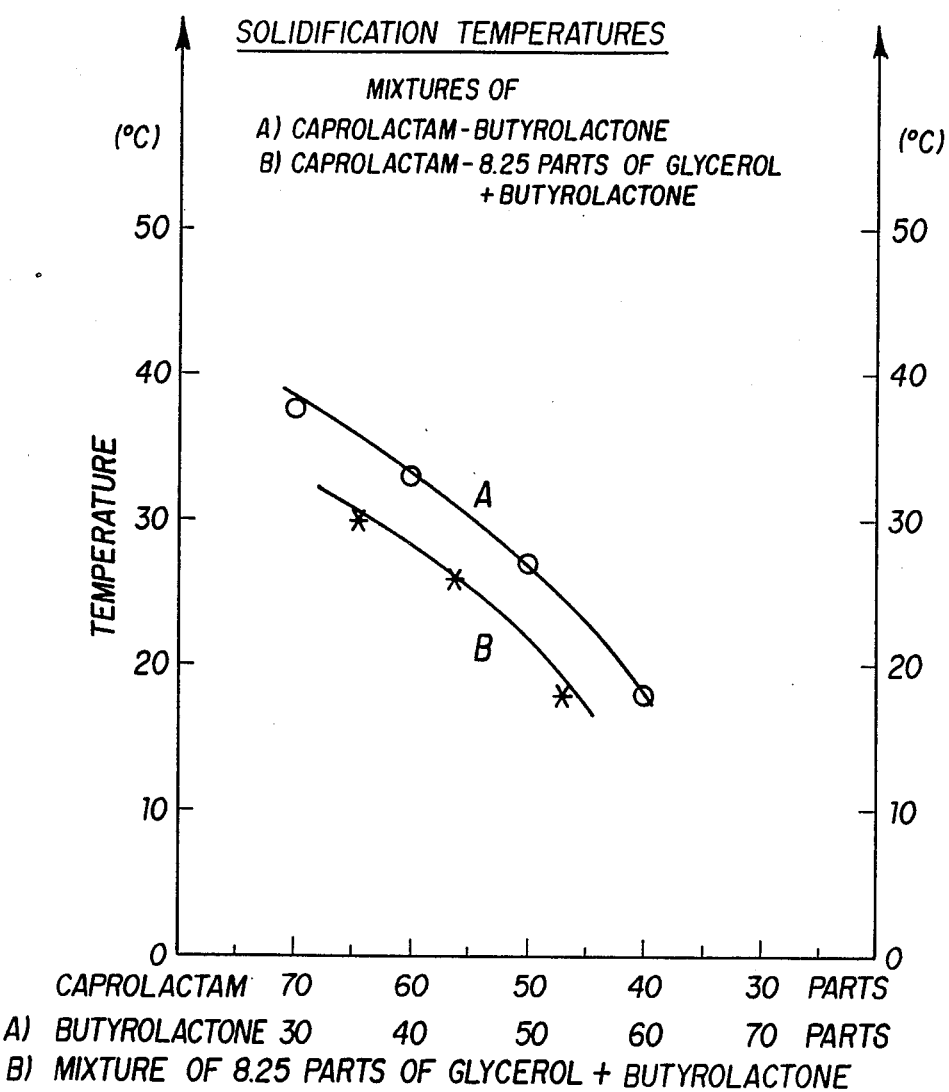
FIG. 2 is a graph of solidification temperature of the solvent mixture as a function of various solution constituents.

FIG. 2 shows the solidification temperatures of the solvent mixture as a function of various solution constituents. In detail, the solidification temperature is plotted on the ordinate, and the compositions of the solvent mixtures are plotted on the abscissa.

FIG. 6 shows a scanning electron micrograph (magnifications 350:1 and 5000:1) of a membrane produced according to Example 1.

FIG. 7 shows likewise scanning electron micrographs (magnifications 390:1 and 5000:1) of membranes of the invention according to Example 5.

The invention is explained in more detail by reference to the following non-limiting examples.

EXAMPLE 1

A homogeneous viscous solution (about 28 PaS/20° C.) was formed at about 110° C. from 15 parts by weight of commercially available polyether-sulfone (type Victrex 5200 from ICI), 77.5 parts by weight of a mixture consisting of caprolactam/butyrolactone/glycerol in a weight ratio of 45.87:45.87:8.26, and 7.51 parts by weight of polyvinylpyrrolidone as thickener.

After degassing and cooling to the spinning temperature of 40° C., hollow fibers of varying wall thicknesses were formed from this solution by means of a hollow fiber jet, using a fluid internal filling, and immediately solidified in the water bath heated to 40° C. After a residence time of about 10–15 seconds in the water bath, the hollow fibers had been stabilized. The extraction of the solvents was carried out by washing with warm water at 80° C. Drying at about 50° C. was preceded by an extraction pass with isopropanol.

The microscopic evaluation of the various capillary dimensions showed, in all variants in the outer region of the membrane, an about 50–100 μm thick, fine-pored, outwardly open structure which merged into an increasingly coarse-pored texture towards the middle of the membrane. Towards the lumen side, the cells become more compact again and formed an open-pored inner surface. FIG. 6 represents the typical cross-section of this membrane.

In Table 2 and FIG. 6, the trans-membrane flows of various hollow fibers of different wall thicknesses are compared.

TABLE 2

| Hollow fibers of 1.0 mm internal diameter | | | | | |
|---|---|---|---|---|---|
| Dimension | | Wall | max. pore | | Transmembrane |
| $d_i$ mm | $d_o$ mm | thickness mm | diameter μm | AF [μm$^{-1}$] | flow water 1/m$^2$ × h × bar |
| A | 1.0 / | 1.28 | 0.14 mm | 0.25 μm | 0.25 | 5972 |
| B | 1.0 / | 1.43 | 0.215 mm | 0.25 μm | 0.17 | 5532 |
| C | 1.0 / | 1.51 | 0.255 mm | 0.25 μm | 0.14 | 4805 |
| D | 1.0 / | 1.56 | 0.28 mm | 0.25 μm | 0.12 | 4362 |
| E | 1.0 / | 1.78 | 0.39 mm | 0.25 μm | 0.09 | 4572 |
| F | 1.0 / | 1.90 | 0.45 mm | 0.25 μm | 0.05 | 4000 |
| G | 1.0 / | 2.18 | 0.59 mm | 0.25 μm | 0.08 | 4000 |
| H | 1.0 / | 2.34 | 0.67 mm | 0.25 μm | 0.07 | 4452 |

EXAMPLE 2

A mixture of 11 25 parts by weight of the polyether-sulfone used in Example 1 and 3.75 parts by weight of a commercially available sulfonated polyether-sulfone was dissolved in caprolactam/butyrolactone/glycerol in a weight ratio of 48:48:6. The hollow fibers, produced in other respects by the method described in Example 1, were immediately wettable with water. They can be used without a hydrophillic treatment, for example with alcohol, for the filtration of aqueous or other hydrophillic media.

EXAMPLE 3

The polymer solution prepared according to Example 1 was spread at room temperature by means of a reverse-roll coater upon a carrier belt and immediately solidified in a warm water bath at 50° C. The resulting flat membrane was washed in water and dried between 50° and 60° C.

The water-wetted flat membrane had the following test values:
Membrane thickness: 0.15 mm
Trans-membrane flow: 6.5 ml/cm$^2$ × minute × bar measured with isopropanol
Trans-membrane flow: about 8000 l/m$^2$ × hour × bar measured with water

EXAMPLE 4

A commercially available polyether-sulfone was dissolved in the solvent mixture of Example 1 to give a 17% by weight solution and formed into a hollow fiber having an external diameter of 1.0 mm and a wall thickness of 0.2 mm.

The resulting, mechanically very stable hollow fiber had a trans-membrane flow with water of 4000 l/m$^2$ × hour × bar at a maximum pore size of <0.25 μm.

EXAMPLE 5

A 15% by weight polyether-sulfone solution in 17.5 parts by weight of caprolactam and 82.5 parts by weight of propylene carbonate with an addition of 8.2% of thickener was spun into hollow fibers. The relatively small proportion of caprolactam caused a very slow stabilization of the fiber. Only after a residence time of about 1 minute was the hollow fiber solidified to such an extent that it was possible to extract it with water.

This gave a water-permeable membrane of asymmetrical structure in the wall cross-section. The trans-membrane flow was 5000 l/m$^2$ × hour × bar. The resulting membrane is shown in the scanning electron micrographs of FIG. 7.

EXAMPLE 6

A warm solution at about 40° C., consisting of 15 parts by weight of polyether-sulfone, dissolved in 66.75 parts by weight of caprolactam, 21.25 parts by weight of butyrolactone and 1·1 parts by weight of glycerol, was spread on a cold glass plate. On cooling of the solution, the solvent crystallized and thus stabilized the membrane formed. After extraction by water, an open-pored, permeable membrane was formed.

What is claimed is:

1. An integral polyether-sulfone membrane having properties sufficient for allowing a flow of fluid therethrough which is largely independent of membrane thickness, said membrane having two surfaces and comprising a pore diameter of 0.02μm to 2 μm, measured by the blow point method, wherein the pore system is cellular throughout with cells having polyhedrally symmetrical boundaries and the cells being arranged asymmetrically from one surface of the membrane to the other surface, as asymmetry factor AF relative to the maximum pore diameter being 0.01 to 2.0, and a ratio of a maximum mean free path length of a flow path to a diameter of the largest pore being greater than 3, and a cell size changing steadily from one surface to the other surface.

2. A membrane as claimed in claim 1 in the form of a flat film, tubular film or hollow fiber.

3. A membrane as claimed in claim 1, wherein the ratio of the maximum mean free path length of the flow path to the diameter of the largest pore is 5–100.

4. A membrane as claimed in claim 1, said membrane having been formed from a mixture containing at least 15% by weight of ε-caprolactam.

5. A membrane as claimed in claim 1, wherein passages between adjacent cells are rounded.

6. A membrane as claimed in claim 1, wherein additives conferring a hydrophillic character have been added during membrane formation.

7. A membrane as claimed in claim 1, wherein the polyether-sulfone is at least partially sulfonated.

8. A membrane as claimed in claim 1, wherein the maximum pore diameter is 0.05 to 0.5 μm.

9. A process comprising producing a polyethersulfone membrane, having properties sufficient for allowing a flow of fluid therethrough which is largely independent of membrane thickness, by dissolving 12 to 35% by weight, relative to a total solution, of polyether-sulfone in a mixture of 15 to 65% by weight of ε-caprolactam, 0 to 85% by weight of latent solvent, 0 to 15% by weight of thickener and 0 to 5% by weight of non-solvent, and a 0 to 1% by weight of auxiliaries, each relative to the mixture; forming a resultant solution into flat films, tubular films or hollow fibers; transforming said films or fibers into a solid phase; and removing the mixture forming solvent.

10. The process as claimed in claim 9, wherein said hollow fibers are formed with the aid of an internal fluid.

11. The process as claimed in claim 9, wherein the dissolution of the polyether-sulfone is carried out at temperatures from 60° to 140° C.

12. The process as claimed in claim 9, wherein, relative to the total solution, 15 to 25% by weight of polyethersulfone is dissolved in a mixture containing 40 to 60% by weight of ε-caprolactam.

13. The process as claimed in claim 9, wherein the transformation into the solid phase is effected by spontaneous crystallization of the solvent mixture after supercooling.

14. The process as claimed in claim 9, wherein the transformation into the solid phase is effected by coagulation in a non-solvent bath, the temperature of the solution and the temperature of the non-solvent bath being 40° to 60° C.

15. The process as claimed in claim 9, wherein the membrane is heat-treated for at least one hour at temperatures of 170°–210° C.

16. A membrane formed by the process of claim 9.

17. A membrane as claimed in claim 16, said membrane being in the form of an ultrafiltration membrane.

18. A membrane as claimed in claim 16, said membrane being in the form of a microfiltration membrane.

19. An integral polyether-sulfone membrane having properties sufficient for allowing a flow of fluid therethrough which is largely independent of membrane thickness, said membrane having two surfaces and comprising a pore system open at the outer boundaries, the pore system being cellular throughout with cells having polyhedrally symmetrical boundaries and the cells being arranged asymmetrically from one surface of the membrane to the other surface, said membrane having been formed from a mixture comprising ε-caprolactam.

20. A membrane as claimed in claim 19 in the form of a flat film, tubular film or hollow fiber.

* * * * *

UNITED STATES PATENT AND TRADEMARK OFFICE
CERTIFICATE OF CORRECTION

PATENT NO.   :   4,976,859
DATED        :   December 11, 1990
INVENTOR(S)  :   Friedbert WECHS It is certified that error appears in the above-identified patent and that said Letters Patent is hereby corrected as shown below:

Col. 1, line 40, after "membrane" insert --formed--.

Signed and Sealed this

Nineteenth Day of May, 1992

Attest:

DOUGLAS B. COMER

Attesting Officer           Acting Commissioner of Patents and Trademarks